US 010707731B2

(12) United States Patent
Sauer et al.

(10) Patent No.: US 10,707,731 B2
(45) Date of Patent: Jul. 7, 2020

(54) METHOD FOR ALIGNING AN ARMATURE SHAFT

(71) Applicant: Robert Bosch GmbH, Stuttgart (DE)

(72) Inventors: Markus Sauer, Achern-Sasbachried (DE); Rainer Grupp, Karlsruhe (DE); Stefan Marke, Buehl (DE); Volker Koeninger, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 15/266,024

(22) Filed: Sep. 15, 2016

(65) Prior Publication Data
US 2017/0085159 A1    Mar. 23, 2017

(30) Foreign Application Priority Data
Sep. 21, 2015    (DE) .................. 10 2015 218 087

(51) Int. Cl.
*H02K 15/02* (2006.01)
*H02K 15/16* (2006.01)

(52) U.S. Cl.
CPC ............. *H02K 15/02* (2013.01); *H02K 15/16* (2013.01); *Y10T 29/49012* (2015.01)

(58) Field of Classification Search
CPC .. F16H 1/16; F16H 1/48; H02K 15/14; H02K 7/003; H02K 7/1166; H02K 15/16; H02K 11/21; H02K 15/02; F01L 2009/0409; F16B 11/004; F02F 2200/04; B21D 3/10; B21D 3/16; B21D 1/00; B21D 31/06; B21D 3/00; B23K 26/0066; B23K 26/0823; B23P 6/00; F16C 32/067; A63B 69/3623; Y10T 74/18856; Y10T 82/2571; Y10T 29/49012
USPC .... 72/418, 16.2, 389.1, 437, 452.7, 455, 53; 451/219; 470/10; 73/37.8; 29/598, 29/402.01, 593, 596, 893.32
See application file for complete search history.

(56) References Cited

U.S. PATENT DOCUMENTS

| 4,226,111 | A | * | 10/1980 | Wahli | ........................ | B21D 1/00 |
| | | | | | | 72/437 |
| 4,306,435 | A | * | 12/1981 | Galdabini | ................ | B21D 3/10 |
| | | | | | | 72/16.2 |
| 6,006,417 | A | | 12/1999 | Brown, Jr. et al. | | |

(Continued)

FOREIGN PATENT DOCUMENTS

| CN | 2219948 Y | 2/1996 |
| CN | 2813835 Y | 9/2006 |
| CN | 203155770 U | 8/2013 |

(Continued)

OTHER PUBLICATIONS

DE102010064087A1_Translated.*
Zhu, Peiqin, "The detecting and straightening of motor axis", Electronic Instrumentation Customer, vol. 12. No. 5, 20051008.

*Primary Examiner* — Thiem D Phan
(74) *Attorney, Agent, or Firm* — Michael Best & Friedrich LLP

(57) ABSTRACT

A method for aligning an armature shaft, wherein in a first step a concentricity error of the armature shaft is determined in the region of the shaft portion by measuring a radial deflection of the armature shaft, and wherein in a second step the radial deflection of the armature shaft is reduced by local deformation of the shaft portion on the side of the bearing element remote from the laminated portion.

11 Claims, 2 Drawing Sheets

(56) References Cited

U.S. PATENT DOCUMENTS 7,310,987 B1 * 12/2007 Rupert .................... B21D 3/10
                                                    72/389.1

FOREIGN PATENT DOCUMENTS

DE    102010064087    *  6/2012  ......... B23K 26/0823
DE    102010064087 A1 *  6/2012  ................ B23P 6/00

* cited by examiner

METHOD FOR ALIGNING AN ARMATURE SHAFT

BACKGROUND OF THE INVENTION

The invention relates to a method for aligning an armature shaft. The invention further relates to an apparatus for aligning an armature shaft.

A known method is disclosed in DE 10 2010 064 087 A1 of the applicant. The disclosed method serves, in particular, for aligning armature shafts which form part of a comfort drive in a motor vehicle (for example in the form of a window lifter drive). The background to the alignment of the armature shaft is that concentricity errors in the armature shaft may result during the production process of the armature shaft. In particular, such concentricity errors may lead to increased operating noise which is perceived as reducing the comfort, in particular with the increasing use of such drives in electric vehicles or newer low-noise vehicles.

From the aforementioned application it is known to perform the alignment of the armature shaft by means of local heating of the armature shaft. To this end, in the known method a laser beam device is used, said laser beam device locally heating the armature shaft in the region of the shaft portion which forms an output region and/or a toothed region or an adjacent region which at least indirectly cooperates with an element to be adjusted. The heating leads to a one-sided expansion and subsequent contraction and/or shrinkage of the material of the armature shaft on the side where the laser beam acts on the armature shaft. It is seen as a drawback in such a method that the investment costs of a laser beam device required for performing the known method are relatively high.

SUMMARY OF THE INVENTION

Proceeding from the prior art set forth, the object of the invention is to develop a method for aligning an armature shaft such that the method is able to be performed at relatively low cost in terms of apparatus technology.

This object is achieved by a method for aligning the armature shaft according to the invention.

The invention is based on the idea that, instead of heating the armature shaft in order to achieve local deformation of the armature shaft, the deformation is achieved by a mechanical action of force. Such a method not only permits the use of an apparatus requiring relatively low investment costs for performing the method but also has the advantage that for monitoring the result of the alignment of the armature shaft, for example, it is not necessary to wait for the stiffening of the armature shaft in the heated region, as in the case of the prior art, but the armature shaft is able to be tested again immediately after the mechanical deformation for the result of the deformation. Thus the method according to the invention makes it possible, in principle, to reduce the required time for aligning the armature shaft relative to the prior art.

In a preferred embodiment of the method according to the invention it is proposed that the mechanical deformation is produced by a material displacement of the armature shaft on the side of the armature shaft facing the radial deflection of the armature shaft. Such a material displacement has the advantage that the armature shaft is only locally mechanically stressed and/or loaded and, for example, not the entire shaft portion with the output region and/or toothed region and/or the laminated core region of the armature as is usually the case, for example, when the armature shaft is plastically deformed by introducing a bending force at one end of the armature shaft or in the middle thereof. Moreover, with such a method the armature shaft is deformed only in a very short region relative to the axial length of the armature shaft, so that in particular the geometry in the output region and/or toothed region of the armature shaft is unaffected by the deformation, when the deformation takes place outside the toothed region.

In a practical embodiment of such a material displacement, it is provided that, for the deformation on the side remote from the deflection of the armature shaft, a bearing element is moved in the direction of the armature shaft, wherein the bearing element is preferably brought into bearing contact with the armature shaft, and that a wedge-shaped tool element is moved toward the armature shaft from the side of the deflection of the armature shaft in alignment with the bearing element, said wedge-shaped tool element penetrating the armature shaft and at the same time producing a notch in the armature shaft by material displacement. Such a method has the advantage, in particular, that by means of the bearing element the armature shaft is supported in a direction extending perpendicular to the longitudinal axis of the armature shaft, so that external forces are avoided on the armature shaft outside the region to be deformed. As a result, it is also permitted in particular to align the armature shaft in a state in which it is already located in its installed state in a motor housing and/or pole well housing and is supported and/or mounted inside the housing by bearing devices. In such a method, therefore, the bearing devices located in the motor housing and/or pole well housing are not subjected to mechanical load so that the bearing devices are not disadvantageously stressed by the alignment process or with regard to the anticipated service life.

It is quite particularly preferred, moreover, when the deformation of the armature shaft takes place in a region which is as close as possible to the bearing device for the armature, i.e. as close as possible on the side of the armature shaft facing the laminated core of the armature. This has the particular advantage that the deformation of the armature shaft required for the alignment is relatively small. As a result, the geometric deviations which are present from an ideal longitudinal axis of the armature shaft are minimized for aligning the armature shaft. In practice, the required distance from the bearing device depends on the overall height of the apparatus at which the local deformation of the armature shaft is performed. In this regard, the extent of such an apparatus and/or corresponding tool elements on the side facing the armature is intended to be minimized.

In order to permit that a concentricity error which is present is removed and/or minimized as far as possible in a single alignment process, it is also provided that the level of force causing the deformation is implemented according to the concentricity error of the armature shaft. To this end, a corresponding control device may be provided, said control device calculating and/or selecting a corresponding force for the tool performing the deformation, depending on the geometric dimensions and/or the thickness and the material of the armature shaft and the measured concentricity error, using a formula or predetermined value. In this case, the control device is able to adapt the values using the current circumstances so that it may be a self-learning system.

A further embodiment of the invention provides that after the alignment of the armature shaft a further detection of the concentricity error of the armature shaft takes place and, depending on the result, the method is repeated if required. As a result, it is ensured that armature shafts are not supplied to a subsequent assembly process when the concentricity error does not lie within specific tolerance limits. Moreover, it permits such a method to minimize the concentricity error which is present.

A further advantageous embodiment of the method provides that when aligning the armature shaft the armature shaft is arranged in a motor housing and/or pole well housing and that the bearing element is a bearing element arranged in the motor housing and/or pole well housing. This means that the armature shaft is aligned in a state where it is already mounted inside its motor housing and/or pole well housing and, for example, a brush device is already mounted. Such a method makes it possible, in particular, to provide a relatively simple fastening of the armature shaft in an apparatus for performing the method, since the motor housing and/or pole well housing only has to be positioned and/or clamped onto a corresponding bearing surface, but the bearing devices of the armature shaft which are located inside the motor housing and/or pole well housing do not themselves have to be supported.

Naturally, it also lies within the scope of the invention to align the armature shaft without a motor housing and/or pole well housing, by the armature shaft being supported, for example, at two points arranged on both sides of an armature region of the armature shaft, according to the aforementioned DE 10 2010 064 087 A1 of the applicant. In this regard, the aforementioned application is intended to form part of this application.

The invention further comprises an apparatus for performing the method according to the invention described above, wherein the apparatus comprises a receiving device for at least indirectly receiving the armature shaft, a measuring device for detecting a concentricity error of the armature shaft and a device for producing a local deformation of the armature shaft. According to the invention, the apparatus is characterized in that the device for producing the local deformation of the armature shaft is configured as a mechanically acting deformation device.

In a practical embodiment of the apparatus according to the invention, it is provided that the deformation device comprises a notching tool which is movable perpendicular to a longitudinal axis of the armature shaft and a bearing element which is arranged on the side of the armature shaft remote from the notching tool and which is also movable perpendicular to the longitudinal axis of the armature shaft. Such an apparatus has the advantage, in particular, that mechanical loads are avoided outside the region of the armature shaft in which the deformation takes place.

The use of the method described above is preferred in electric motors and/or drives which serve as a comfort drive in a motor vehicle. By way of example, such a comfort drive is understood in a non-limiting manner as a window lifter drive, a seat adjustment drive, a windshield wiper drive or the like.

BRIEF DESCRIPTION OF THE DRAWINGS

Further advantages, features and details of the invention are revealed from the following description of preferred exemplary embodiments and with reference to the drawings, in which.

The same elements and/or elements having the same function are provided in the figures with the same reference numerals.

DETAILED DESCRIPTION

Figure 1:
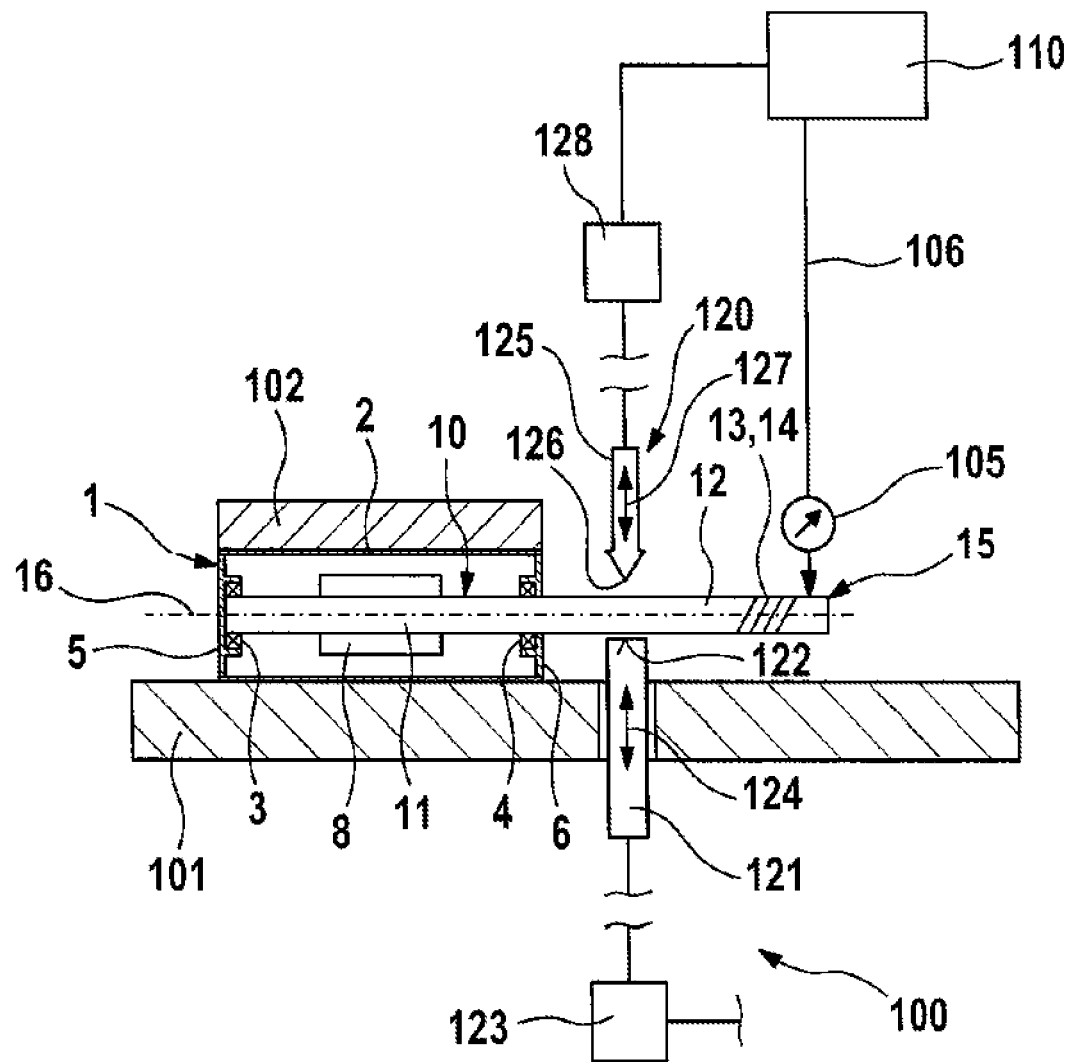
FIG. 1 shows a simplified view of an apparatus for aligning an armature shaft in side view and FIG. 2 and FIG. 3 also show in very simplified side views the method according to the invention for aligning the armature shaft before and after aligning the armature shaft.

In FIG. 1 an electric motor 1 is shown in very simplified form, as it serves as a component of a comfort drive in a motor vehicle. The electric motor 1 has by way of example a motor housing and/or pole well housing 2, an armature shaft 10 being mounted therein by means of two bearing devices 3, 4. The two bearing devices 3, 4 are located in each case on a front end region of the motor housing and/or pole well housing 2, for example in the region of a housing base 5 and/or a brush carrier holder 6. An armature 8, only shown schematically, is also arranged inside the motor housing and/or pole well housing 2, in the region between the two bearing devices 3, 4. The region in which the laminated core of the armature 8 is arranged and/or fastened (fixedly in terms of rotation) to the armature shaft 10 forms a laminated portion 11 of the armature shaft 10.

The armature shaft 10 protrudes from the motor housing and/or pole well housing 2 with a shaft portion 12 which is axially spaced apart from the laminated portion 11. In particular, the shaft portion 12 forms on the side remote from the bearing device 4 and/or the motor housing and/or pole well housing 2 an output region 13 which, for example, has a toothed region 14.

The electric motor described above 1 is arranged in an apparatus 100 for aligning the armature shaft 10. The apparatus 100 has by way of example a carrier plate 101 as part of a receiving device, the electric motor 1 being fixedly fastened with its motor housing and/or pole well housing 2 on the upper face thereof. By way of example, a hold-down device 102 which is also part of the receiving device and which presses the electric motor 1 against the carrier plate 101 serves therefor. Moreover, by way of example the apparatus 100 on the axial end region 15 of the armature shaft 10 comprises a measuring device 105 for detecting a concentricity error of the armature shaft 10.

Naturally, it is within the scope of the invention to use not only a measuring device 105 but a plurality of measuring devices 105 which are arranged axially spaced apart from one another relative to a longitudinal axis 16 of the armature shaft 10 in order to detect the concentricity error of the armature shaft 10, not only in the end region 15 but at a plurality of regions outside the motor housing and/or pole well housing 2 and/or the shaft portion 12.

The measuring device 105 is connected via a cable 106 to an evaluation and control unit 110. The apparatus 100 further comprises a device 120 for producing a local deformation of the armature shaft 10. The device 120 has a bearing element 121 which on the side facing the armature shaft 10 forms a bearing surface 122. The bearing element 121 passes through the carrier plate 101, by way of example in a through-opening, and is coupled to an adjusting drive 123 which is able to be activated by the device 110. In particular, the bearing element 121 is movably arranged in the direction of the double arrow 124, such that in a raised position of the bearing element 121 the bearing surface 122 bears against the armature shaft 10.

A tool element 125 is arranged with a wedge-like tip 126 in alignment with the bearing element 121 on the side of the armature shaft 10 opposing the bearing element 121. The tool element 125 is also movably arranged in the direction of the double arrow 127 and is activated via an adjusting drive 128 by the device 110. Both the movement of the bearing element 121 and that of the tool element 125 take place at least substantially perpendicular to the alignment of the longitudinal axis 16 and/or perpendicular to the carrier plate 101 in the case where the armature shaft 10 and/or the motor housing and/or pole well housing 2 are aligned with the carrier plate 101.

It is also essential that both the bearing element 121 and the tool element 125 are arranged as close as possible to the motor housing and/or pole well housing 2.

The alignment of the armature shaft 10 of the electric motor 1 is described by way of example hereinafter with reference to FIGS. 2 and 3. Here the case is shown in which the armature shaft 10 is not yet arranged and/or mounted in the motor housing and/or pole well housing 2, in contrast to the exemplary embodiment shown in FIG. 1. Two bearing devices 18, 19 are identified, said bearing devices being arranged on both sides of the armature 8 in order to align and/or support the armature shaft 10 in the armature portion 11 relative to the carrier plate 101, not shown. It may also be seen that the end region 15 of the armature shaft 10 has a concentricity error a, wherein for aligning the armature shaft 10 the armature shaft 10 is rotated such that the concentricity error a is arranged on the side facing the tool element 125 and/or is aligned therewith.

Figure 2:
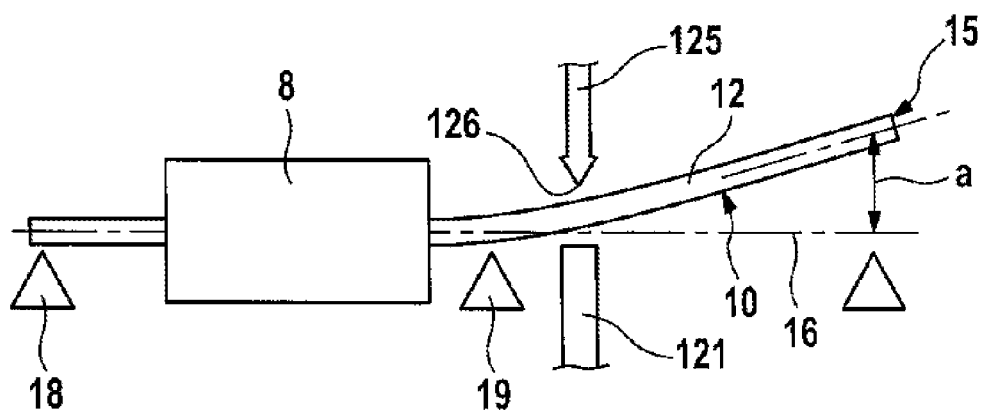
Figure 3:
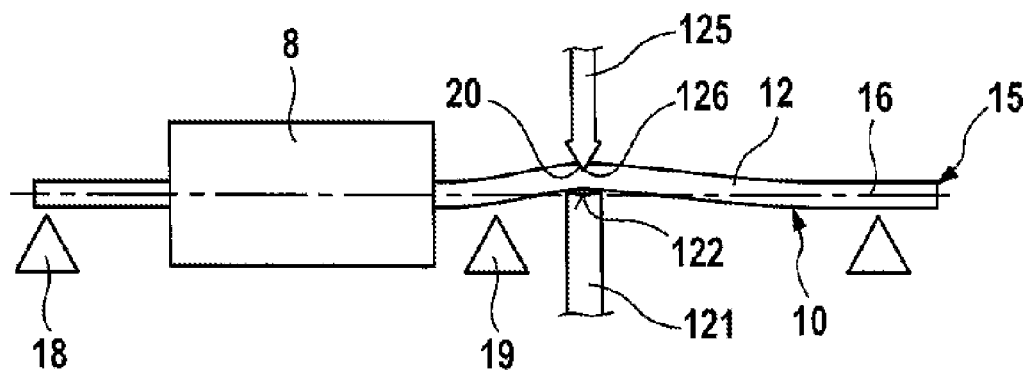

In the state shown in FIG. 2 the bearing element 121 and the tool element 125 are initially still spaced apart from the armature shaft 10. For aligning the armature shaft 10 according to the view of FIG. 3, the bearing element 121 is subsequently brought with its bearing surface 122 into bearing contact with the armature shaft 10. At the same time and/or shortly afterwards, the tool device 125 is moved toward the armature shaft 10, wherein the tip 126 of the tool device 125 penetrates the surface of the armature shaft 10 forming a notch 20 and plastically deforms the armature shaft 10 in this region by material displacement. The plastic deformation of the armature shaft 10 has the result that the armature shaft 10 on the side of the tool device 125 remote from the armature 8 is deformed in the direction of the (ideal) longitudinal axis 16 of the armature shaft 10, so that by way of example the end region 15 is level with the longitudinal axis 16.

Subsequently, it may be provided that the armature shaft 10 is measured again by means of the measuring device 105 for the concentricity error a, and when predetermined tolerance limits are exceeded the method described above is repeated.

The method described above for aligning the armature shaft 10 and/or the apparatus 100 may be altered and/or modified in any manner without departing from the inventive idea.

What is claimed is:

1. A method for aligning an armature shaft (10), wherein the armature shaft (10) comprises an armature (8) with a laminated portion (11) and a shaft portion (12) axially spaced apart from the laminated portion (11), wherein the shaft portion (12) has an output region (13), wherein a bearing element (4; 19) is fastened between the armature (8) and the output region (13), the method comprising:

determining a concentricity error (a) of the armature shaft (10) in a region of the shaft portion (12) by measuring a radial deflection of the armature shaft (10); and reducing the radial deflection of the armature shaft (10) by local deformation of the shaft portion (12) on a side of the bearing element (4; 19) remote from the laminated portion (11), wherein the local deformation is produced by a mechanical deformation of the shaft portion (12) such that the geometry in the output region of the shaft is unaffected by the deformation.

2. The method according to claim 1, characterized in that the mechanical deformation is produced by a material displacement of the armature shaft (10) on a side of the armature shaft (10) facing the radial deflection of the armature shaft (10).

3. The method according to claim 2, characterized in that, for the deformation on a side remote from the deflection of the armature shaft (10), a bearing element (121) is moved in the direction of the armature shaft (10), wherein the bearing element (121) is brought into bearing contact with the armature shaft (10), and that a wedge-shaped tool element (125) is moved toward the armature shaft (10) from the side of the deflection of the armature shaft (10) in alignment with the bearing element (121), said wedge-shaped tool element penetrating the material of the armature shaft (10) and producing a notch (20) in the armature shaft (10) by material displacement.

4. The method according to claim 1, characterized in that the local deformation is produced in a region in the vicinity of the bearing element (4; 19).

5. The method according to claim 1, characterized in that the level of force causing the deformation of the armature shaft (10) is implemented according to the concentricity error (a) of the armature shaft (10).

6. The method according to claim 1, characterized in that after an initial alignment of the armature shaft (10) a further detection of the concentricity error (a) of the armature shaft (10) takes place and, the method is repeated if the further detection of the concentricity error exceeds a predetermined tolerance limit.

7. The method according to claim 1, characterized in that a tool element (125) transmits a force to the armature shaft (10) which effects an asymmetrical distribution of mechanical stress in the armature shaft (10), whereby the free end of the armature shaft (10) bends away from the tool element (125).

8. The method according to claim 7, characterized in that the level of force causing the deformation of the armature shaft (10) is implemented according to the concentricity error (a) of the armature shaft (10).

9. The method according to claim 1, wherein the output region (13) is in the form of a toothed region (14).

10. The method according to claim 1, characterized in that the local deformation is produced in a region in the vicinity of the bearing device (4; 19), wherein a spacing between the bearing device (4; 19) and a notch (20) corresponds to a maximum spacing between the notch (20) and the output region (13) of the armature shaft (10).

11. The method according to claim 1, characterized in that a tool element (125) transmits a short force impulse to the armature shaft (10) which effects an asymmetrical distribution of mechanical stress in the armature shaft (10), whereby the free end of the armature shaft (10) bends away from the tool element (125), at the free end up to 100 μm.

* * * * *